(12) United States Patent
Accornero

(10) Patent No.: US 10,914,440 B1
(45) Date of Patent: Feb. 9, 2021

(54) BRACKET FOR MOUNTING LIGHT FIXTURES

(71) Applicant: John J. Accornero, South Pasadena, CA (US)

(72) Inventor: John J. Accornero, South Pasadena, CA (US)

( * ) Notice: Subject to any disclaimer, the term of this patent is extended or adjusted under 35 U.S.C. 154(b) by 342 days.

(21) Appl. No.: 15/798,356

(22) Filed: Oct. 30, 2017

(51) Int. Cl.
*F16M 13/02* (2006.01)
*F21S 8/00* (2006.01)
*F21V 21/02* (2006.01)

(52) U.S. Cl.
CPC ............. *F21S 8/037* (2013.01); *F21V 21/02* (2013.01); *F16M 13/025* (2013.01)

(58) Field of Classification Search
USPC ....................................................... 248/220.1
See application file for complete search history.

(56) References Cited

U.S. PATENT DOCUMENTS

| | | | | |
|---|---|---|---|---|
| 2,340,545 A * | 2/1944 | Marsh | ...................... | B65D 9/32 217/65 |
| 2,800,577 A * | 7/1957 | Block | ...................... | F21S 8/037 362/227 |
| 4,862,333 A * | 8/1989 | Brasket | ................... | F21S 8/033 362/147 |
| 5,057,980 A * | 10/1991 | Russell | ................... | F21S 8/033 174/64 |
| 6,484,983 B1 * | 11/2002 | Combest | .............. | A47B 81/002 248/220.1 |
| 7,055,992 B1 * | 6/2006 | Accornero | .............. | F21S 8/033 362/368 |
| 7,226,027 B1 * | 6/2007 | Feeley | ................... | A47G 7/044 248/220.1 |
| 8,998,008 B1 * | 4/2015 | Robertson | ............ | A47B 96/022 108/42 |
| 9,306,604 B2 * | 4/2016 | Jurawan | ................... | H04B 1/03 |
| 2012/0187264 A1 * | 7/2012 | Vlies | ...................... | F16M 11/10 248/220.1 |
| 2014/0293611 A1 * | 10/2014 | Accornero | .............. | F21V 21/02 362/296.01 |

* cited by examiner

*Primary Examiner* — Monica E Millner
(74) *Attorney, Agent, or Firm* — Frederic M. Douglas (57) ABSTRACT

The present invention may comprise a corner mounted bracket for an indirect lighting fixture, mounted flush against vertical walls in a building. The bracket may engage a mounting bracket along an edge. The bracket may have a transverse cross-section in a trapezoidal shape. The bracket may be attached to a vertical wall with screw fasteners. An engagement edge of the bracket may interface with a hook or other structure to engage with a structure to be hung, suspended, or otherwise supported. The bracket may be used in conjunction with a lighting fixture, shelving, or other structures for hanging or supporting securely on vertical walls.

7 Claims, 8 Drawing Sheets

BRACKET FOR MOUNTING LIGHT FIXTURES

BACKGROUND OF THE INVENTION

The present invention relates generally to fastening products. More specifically, the present invention relates to a bracket for mounting structures in a corner of vertical walls, such as lighting fixtures, shelving, or other items.

Indirect lighting fixtures are designed to be installed in locations that are not prominent and emit light at an out of the way location. Indirect lighting fixtures may be mounted near a ceiling to direct light to the ceiling. Another common location for indirect lighting fixtures is in a corner where two vertical walls meet.

Corner light fixtures can provide an attractive external appearance as a decorative item for residences or offices. Suitable mounts are desirable for securely installing corner light fixtures while situating the emitted light in an advantageous position to take advantage of available light, accounting for heat effects from the lighting to the adjacent walls, and ease of installation and removal.

Certain brackets are known which comprise elongated sheet metal panels wherein the brackets are bolted or screwed to a wall or post. However, such brackets often are difficult to manufacture and difficult to use, especially when trying to mount items in a corner of vertical walls to firmly mount lighting fixtures, shelves, and other items.

Thus, it would be advantageous to have a bracket that combines the ability to stably support a shelf; the ability to quickly and removably mount or suspend a variety of configurations, such as lighting fixtures, fit into a corner; manufactured at lower cost and with facility, such as by folding a sheet of rigid material that has been stamped, such as from paper, cardboard, plastic, wood, steel, or other suitable materials.

As will be seen more fully below, the present invention is substantially different in structure, process, and approach from that of the prior mounting systems.

SUMMARY OF THE INVENTION

In one aspect of the present invention, a corner mounted bracket comprises a substantially flat, rigid backing panel, a first side panel fixed to a first side of the backing panel, a second side panel fixed to a second side of the backing panel, a step panel fixed to a top side of the backing panel and to a top side of the first side panel and to a top side of the second side panel, and an outward flange fixed to one end of the step panel.

In another aspect of the present invention, a corner mounted bracket comprises a substantially flat, rigid backing panel, a first side panel fixed to a first side of the backing panel, a second side panel fixed to a second side of the backing panel, a step panel fixed to a top side of the backing panel and to a top side of the first side panel and to a top side of the second side panel, an outward flange fixed to one end of the step panel, and a retaining scoop projecting downward in a direction at about 45 degrees away from a main plane of the backing panel.

In yet another aspect of the present invention, a method for using the device comprises positioning the device such that the backing panel rests against a vertical wall; allowing a lighting fixture to rest on the outward flange; allowing the weight of the device to be held to act upon the outward flange, and allowing a resulting moment to pull the outward flange tightly against the step panel.

These and other aspects, objects, features, and advantages of the present invention are specifically set forth in or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense but is made merely for the purpose of illustrating the general principles of the invention, since the scope of the invention is best defined by the appended claims.

Although the invention is often referred to herein as a bracket for mounting light fixtures, it is understood that such description is not limiting, such that the technology in this invention may be applied in numerous other products and methods, including but not limited to supports for hanging shelving, plants, pots, tools, or other items to be hung, mounted, supported, suspended, installed, or otherwise engaged physically. In general, the order of the steps of disclosed methods may be altered within the scope of the invention.

Figure 1:
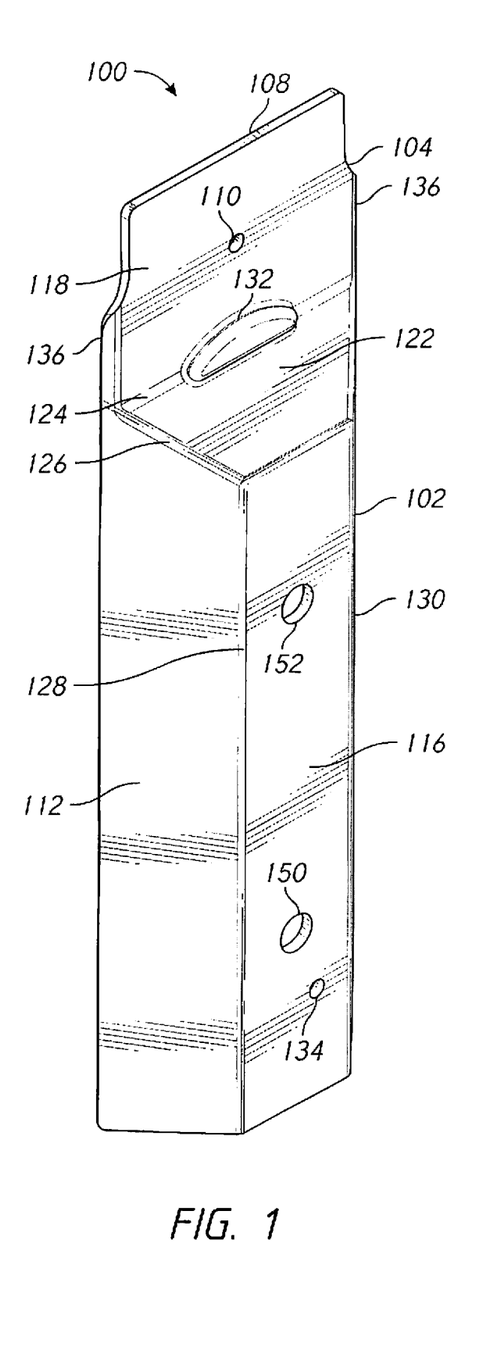
FIG. 1 is a rear elevation perspective view of the device, according to an embodiment of the present invention.

As shown in FIG. 1, one aspect of the present invention may comprise a bracket 100 comprising a substantially flat, rigid backing panel 102, a first side panel 112 fixed to a first side 128 of the backing panel 102, a second side panel 114 fixed to a second side 130 of the backing panel 102, a step panel 122 fixed to a top side 126 of the backing panel 102 and to a top side 126 of the first side panel 112 and to a top side 126 of the second side panel 114, and an outward flange 104 fixed to one end 124 of the step panel 122.

The configuration of the bracket 100 may vary, such as wherein the outward flange 104 may be substantially parallel with the backing panel 102 and the outward flange 104 may be substantially orthogonal with the step panel 122. The step panel may be of various suitable shapes, such as a substantially trapezoidal shape, as shown. For attachment to surfaces, such as walls, screws or bolts (not shown) may be used by fastening through holes 150 and 152 while engagement with fixtures may be secured through cooperation with hole 110 in the outward flange 104.

The outward flange 104 may be fixed to one end 126 of the first side panel 112 and one end 126 of the second side panel 114. The outward flange 104 may be connected to the backing panel 102 by ears 136, or ears 136 may be integral to the bracket 100 to provide strength and durability during installation, removal, and other actions. The first side panel 112 may be disposed at about 135 degrees from a main plane of the backing panel 102 with the second side panel 114 may be disposed at a similar angle, such as about 135 degrees from a main plane of the backing panel 102. The angle positional relationship among the panels may be conforming to an external shape of the step panel 122. A bead 132 may be formed at or near one end 124 of the step panel 122 to provide additional strength and durability, such as from flexing of the outward flange 104 along the end 124 of the step panel 122.

The bracket 100 may comprise a single sheet of rigid material or a combination of parts with a variety of materials. For example, the first side panel 112 and the second side panel 114 may comprise a rigid material, optionally constructed from a single sheet of rigid material. An offset hole 134 may be made in the bracket 100, such as in the backing panel 102 to optionally avoid securing the bracket 100 at the hole 150, where a power cord or other equipment may be obstructed otherwise.

Figure 2:
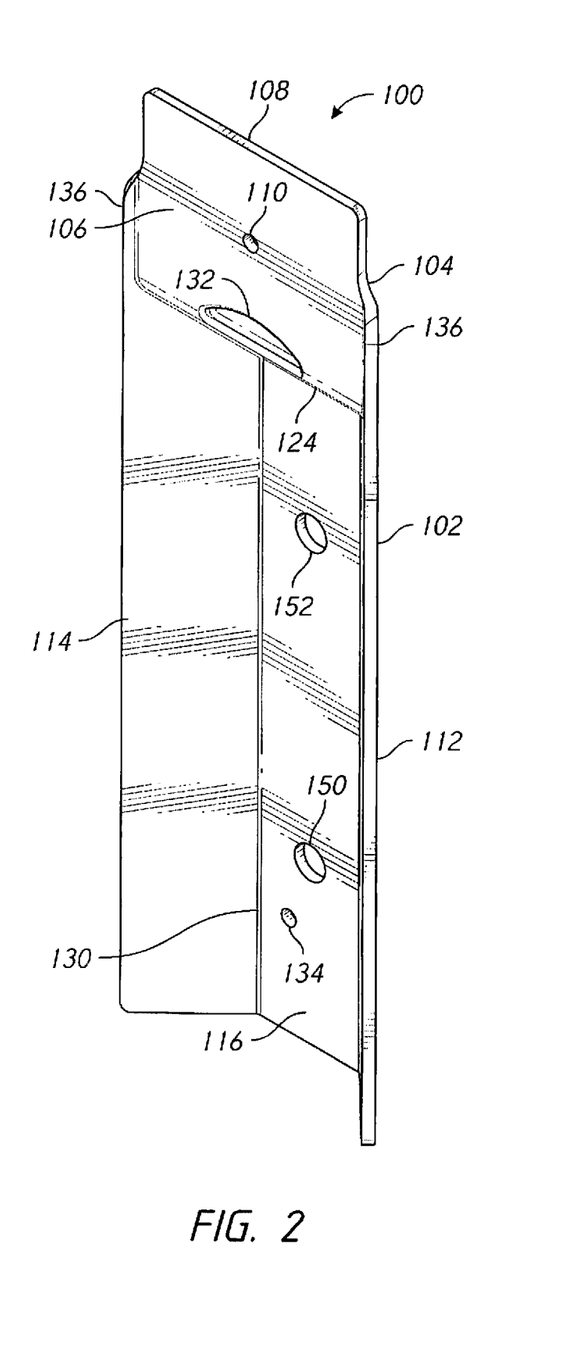
FIG. 2 is a front elevation perspective view of the device, according to an embodiment of the present invention.
Figure 3:
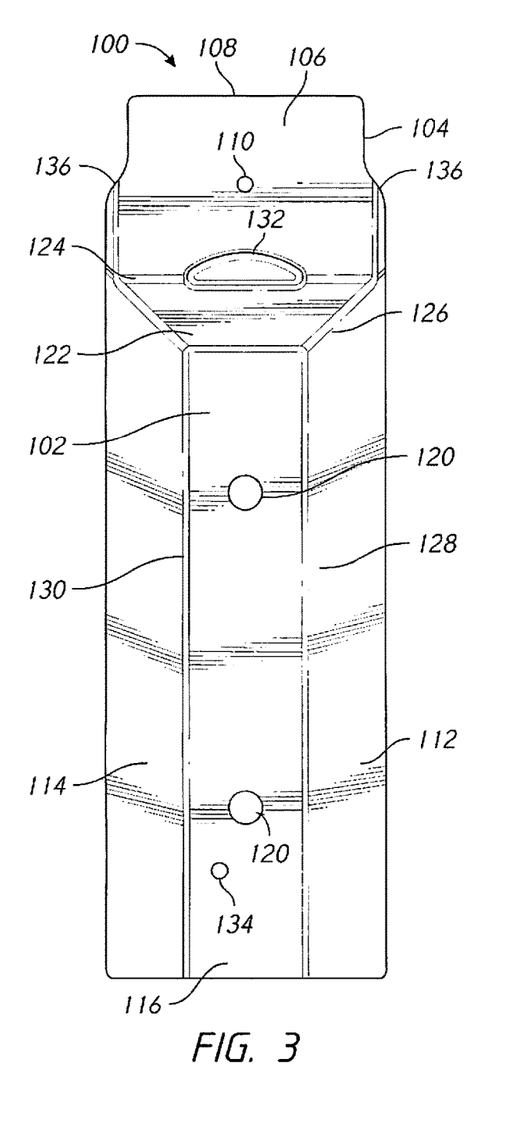
FIG. 3 is a front view of the device, according to an embodiment of the present invention.
Figure 4:
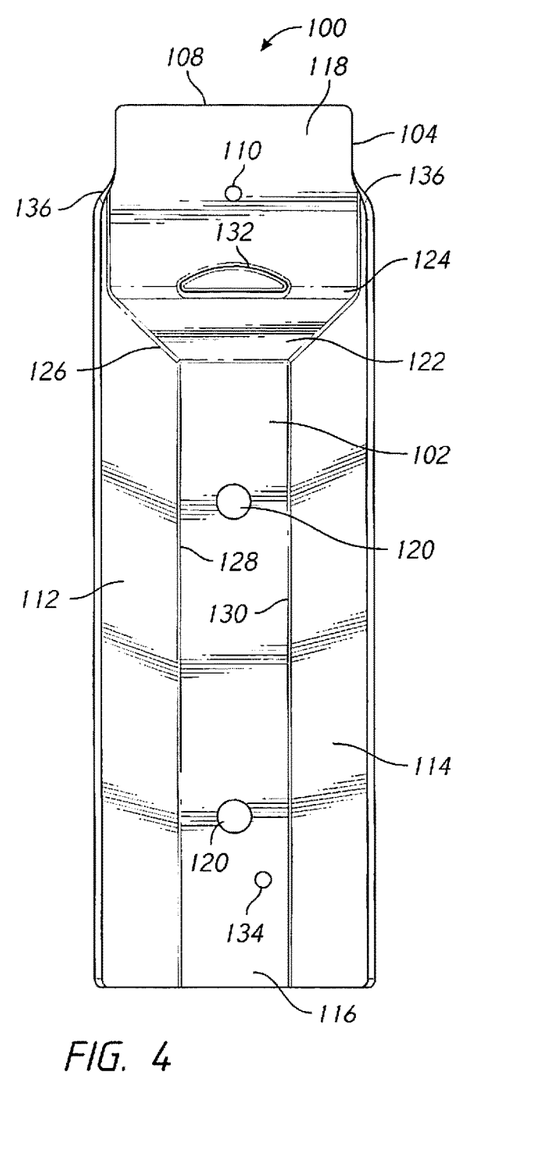
FIG. 4 is a rear view of the device, according to an embodiment of the present invention.

FIG. 2 shows another view of the bracket 100, a front elevation perspective view. FIG. 3 illustrates a front view of the bracket 100 while FIG. 4 illustrates a rear view.

Figure 5:
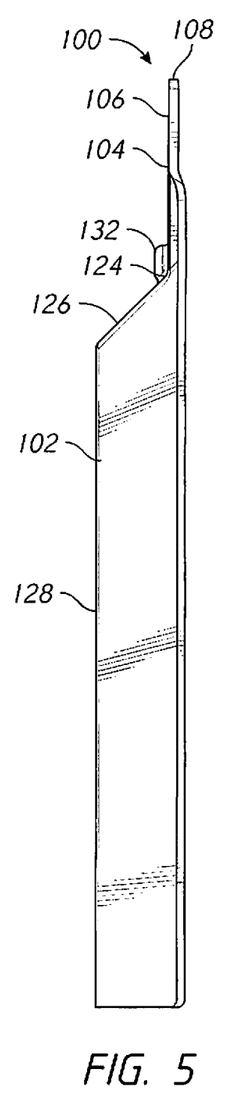
FIG. 5 is a side elevation view of the device, from one side, according to an embodiment of the present invention.
Figure 6:
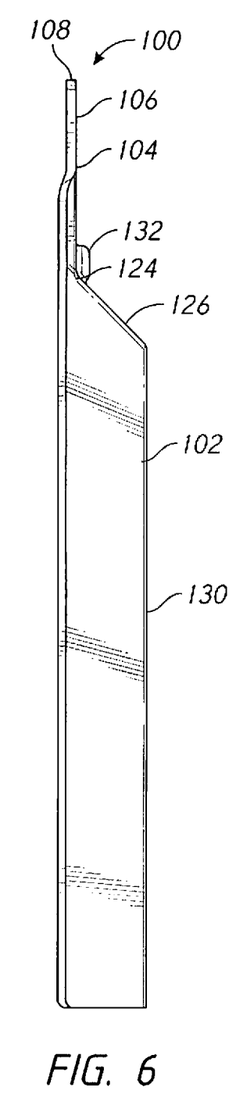
FIG. 6 is a side elevation view of the device, from another side, according to an embodiment of the present invention.

FIG. 5 is a side elevation view of the bracket 100, and FIG. 6 is a side elevation view of the bracket 100, from another side. Engagement edge 108 of the bracket 100 may mate with a lighting fixture (not shown) for suspending, hanging, or otherwise mounting a light fixture, according to an embodiment of the present invention.

Figure 7:
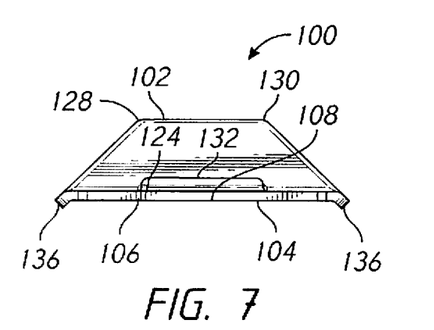
FIG. 7 is a side view of the device, with a flange on a proximal end, according to an embodiment of the present invention.
Figure 8:
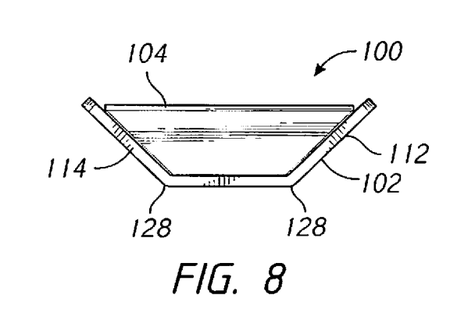
FIG. 8 is a side view of the device, with a flange on a distal end, according to an embodiment of the present invention.

FIG. 7 shows a side view of the bracket 100 from a top, with the flange 104 on a proximal and FIG. 8 shows a side view of the same bracket 100 with the flange 104 from a distal end. The flange 104 may have a first side 106 and a second side 108 for mating with a clip or other structure of a lighting fixture (not shown).

Figure 9:
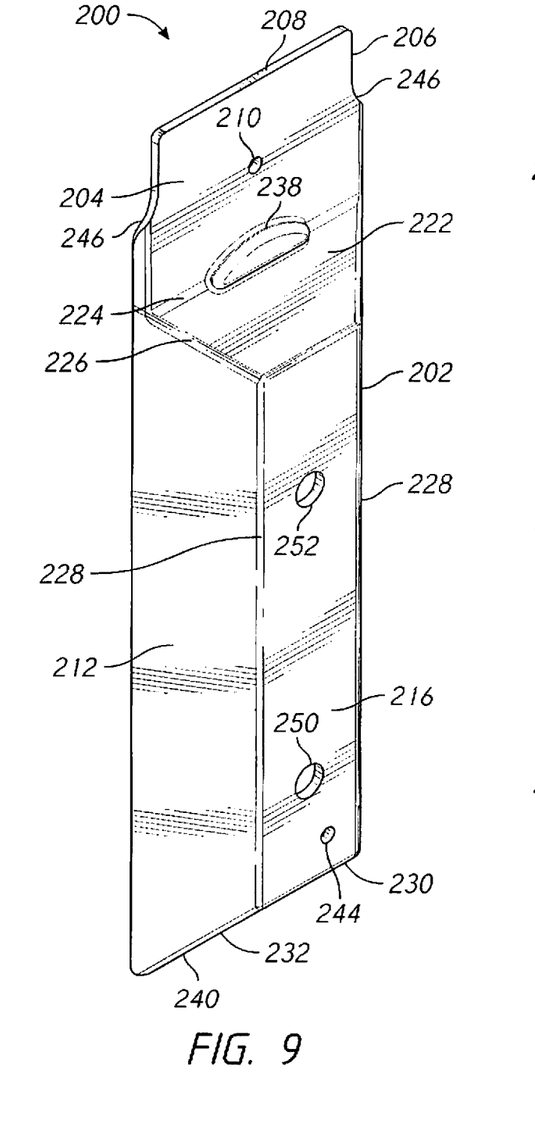
FIG. 9 is a rear elevation perspective view of the device, according to another embodiment of the present invention.
Figure 10:
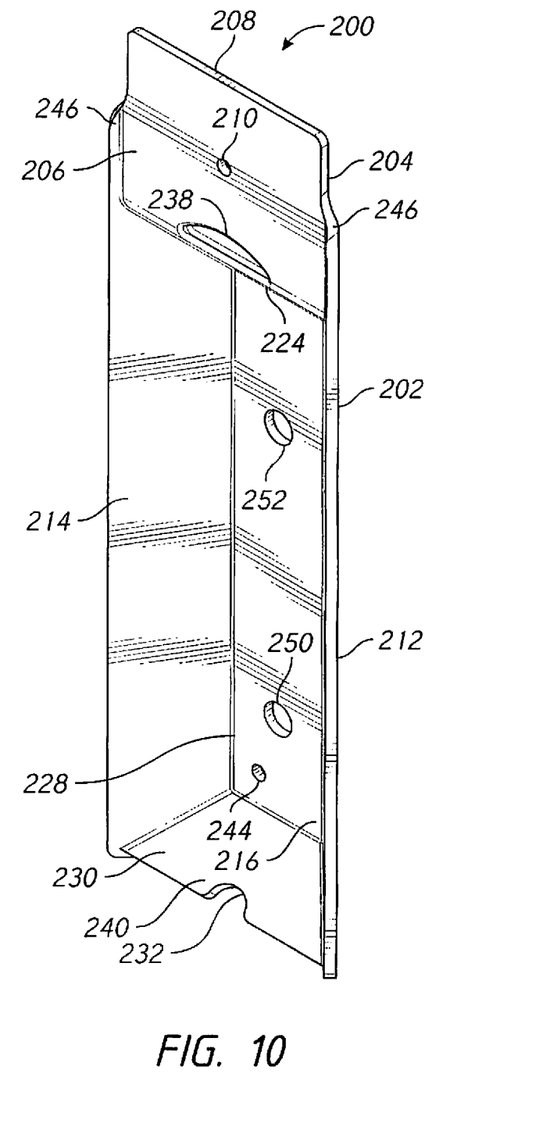
FIG. 10 is a front elevation perspective view of the device, according to another embodiment of the present invention.
Figure 11:
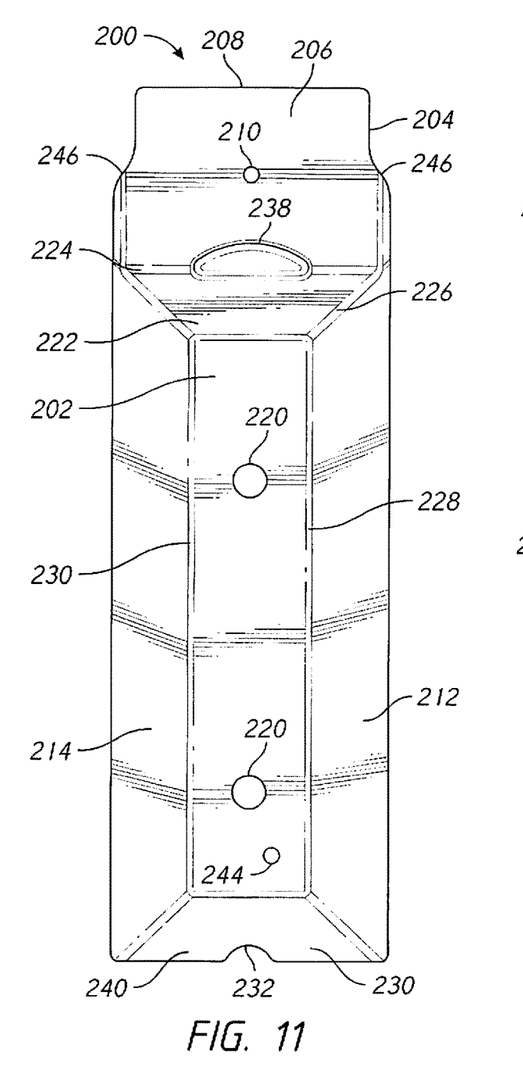
FIG. 11 is a front view of the device, according to another embodiment of the present invention.
Figure 12:
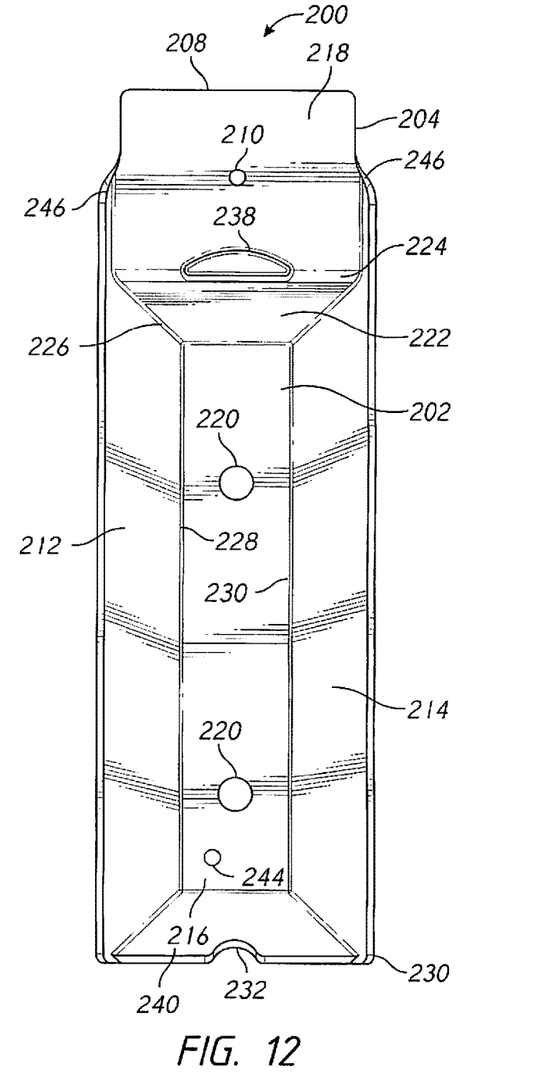
FIG. 12 is a rear view of the device, according to another embodiment of the present invention.
Figure 13:
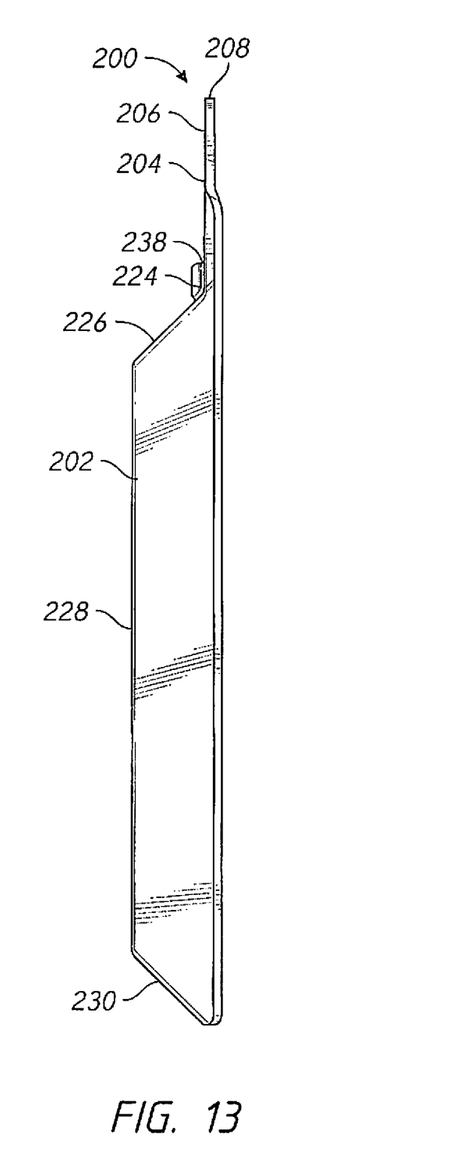
FIG. 13 is a side elevation view of the device, from one side, according to another embodiment of the present invention.
Figure 14:
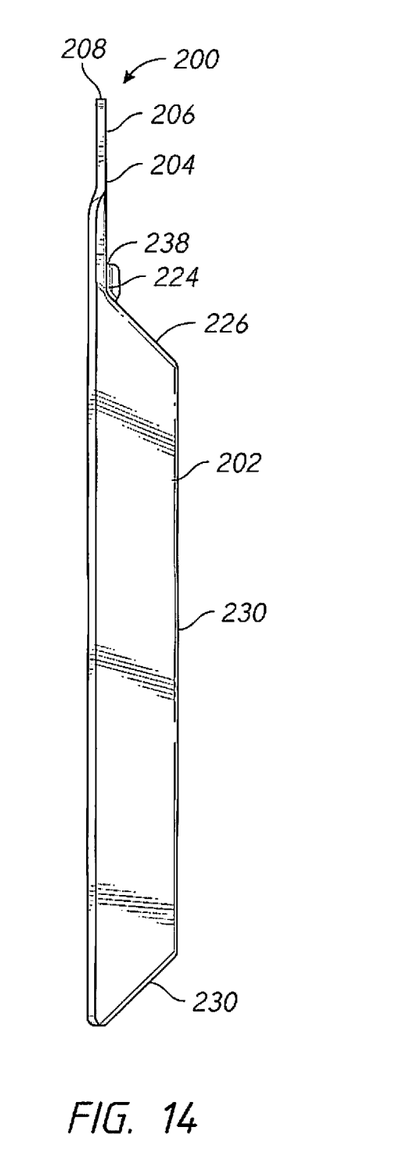
FIG. 14 is a side elevation view of the device, from another side, according to another embodiment of the present invention.

Turning to FIG. 9, another embodiment is shown with a bracket 200 comprising a retaining scoop 230 at the bottom of the bracket 200. The retaining scoop 230 may serve to further support or hold items or structures, such as lighting fixture bottoms. An outward flange 204 may be fixed to one end 224 of the step panel 222 with a bead 238, and the retaining scoop 230 may be projecting downward in a direction at about 45 degrees away from a main plane of the backing panel 202

A notch 232 may assist engagement from a scoop foundation panel 240. The scoop 230 may be constructed as part of a single piece, a piece separate from other panels in the bracket 200, optionally from a rigid material or a material more flexible than the remaining portions of the bracket 200. Similar to the bracket illustrated in FIGS. 1-8, the bracket 200 with a retaining scoop 230 may be similarly structured with a backing panel 202 and an outward flange 204. The outward flange 204 may have an engagement edge 208 and a hole 210 in the outward flange 204. with first side 204 and second side 206, joined at an edge 224 to step panel 222, along top edges 226, with ears 246. Holes 250 and 252 may be used in the backing panel 202 joined at edges 228 to side panels 212, 214. An offset hole 244 may serve to alternately or cooperatively secure the bracket 200 to a surface, such as a wall, a lighting fixture, or other structures.

FIGS. 10-14 illustrate other views of the bracket 200 with the retaining scoop 230, similar to the various views shown in FIGS. 1-6 described previously.

Figure 15:
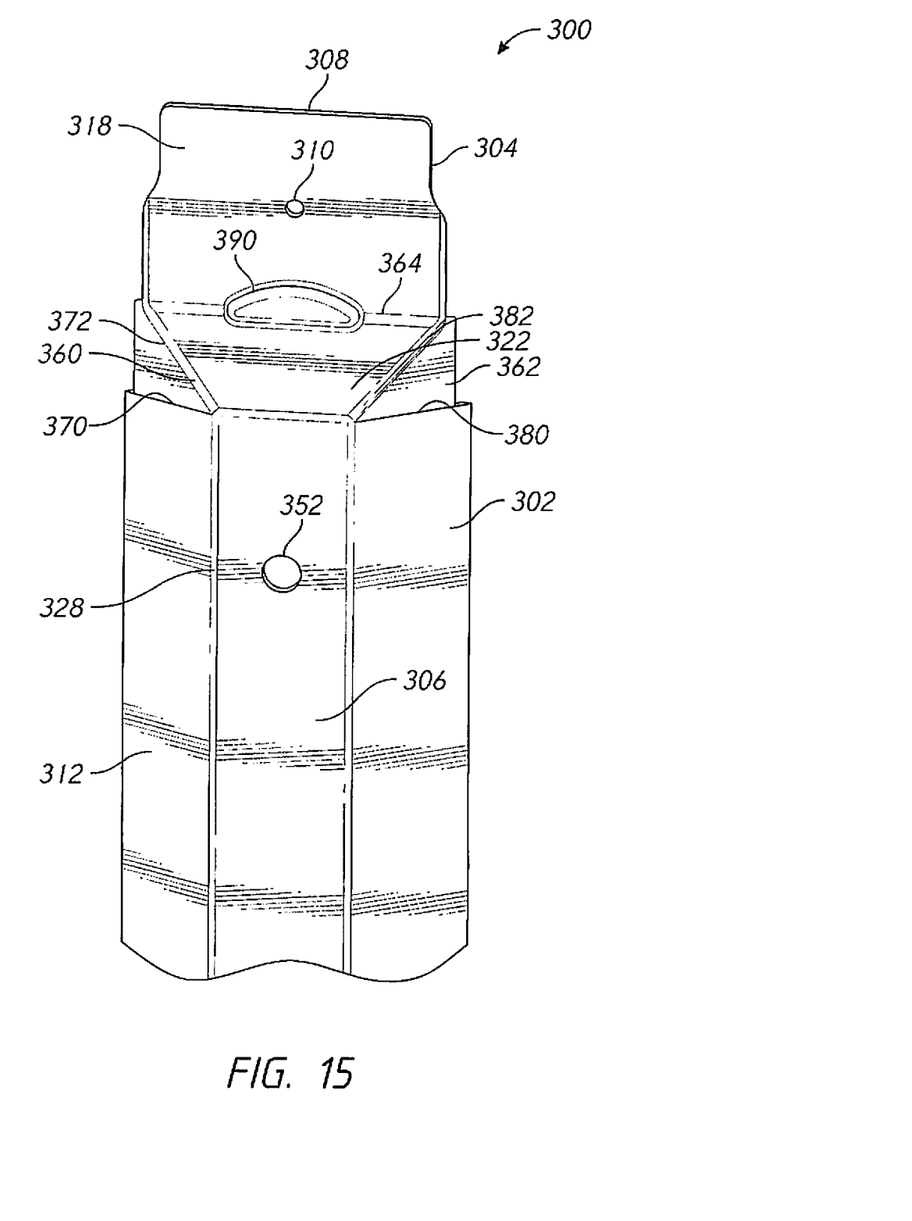
FIG. 15 is a perspective view of the device, according to yet another embodiment of the present invention.

Turning to FIG. 15, yet another embodiment may comprise a bracket 300 further comprising a first stabilizing panel 360 fixed between an edge 370 of the first side panel 312 and an edge 372 of the step panel 322 and a second stabilizing panel 362 fixed between an edge 380 of the second side panel 302 and an edge 382 of the step panel 322. This embodiment, with side panels 302, 312, outward flange 304, and backing panel 306 permeated with holes 310, 352 may serve to partially flex by deflection of stabilizing panels 302, 312, step panel 322, and edges 328, 364, 370, 372, 380, 382 to accommodate varying loads from structures engaging with the outward flange 304, the flange edge 308, along plane 318, and other portions when suspending, hanging, mounting, or otherwise supporting weight from items. Flexing may be limited by the placement of a bead 390 on or near edge 364 or in other useful locations.

Figure 16:
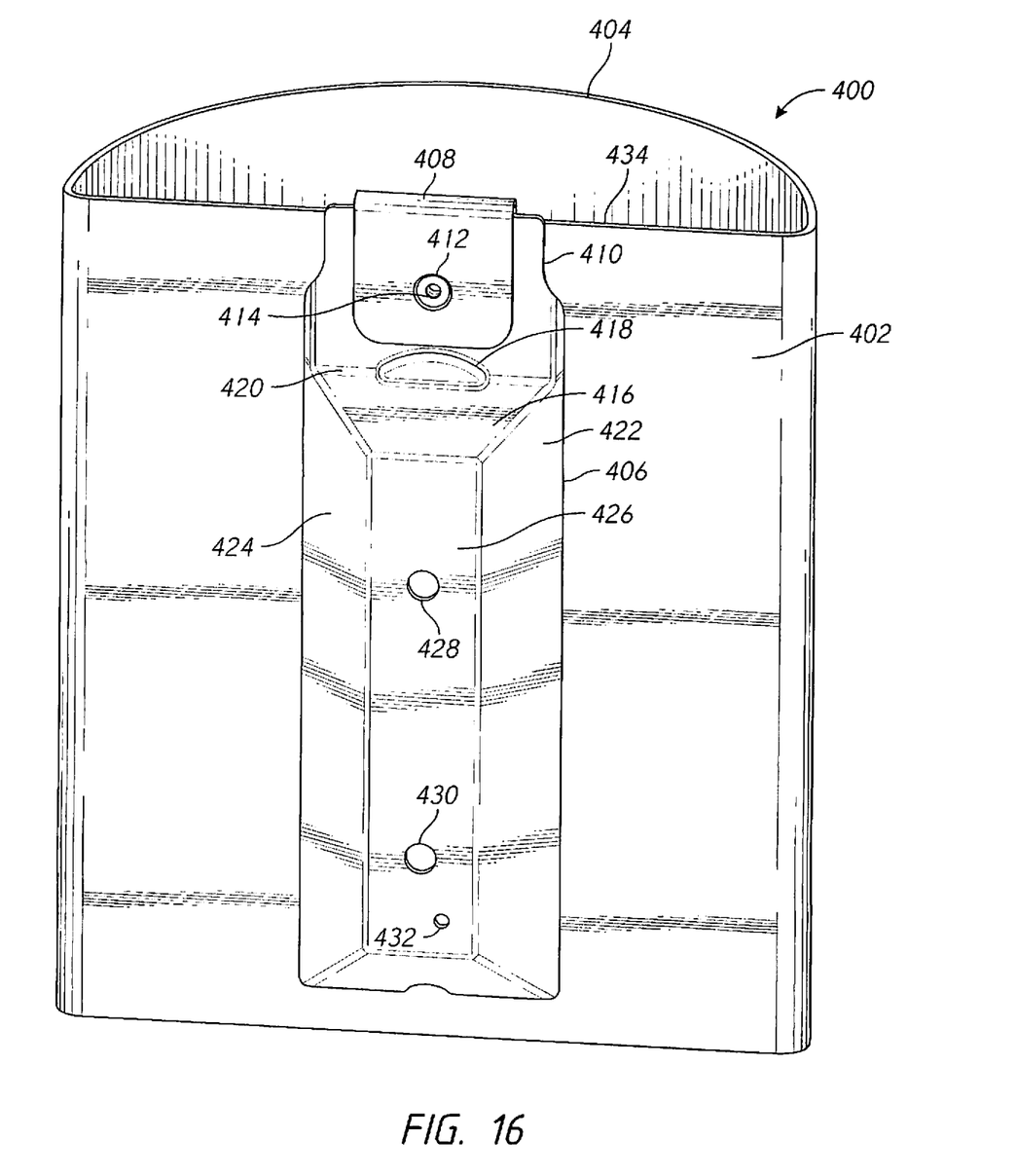
FIG. 16 is an elevation view of a bracket installed to support a lighting fixture.

An exemplary embodiment of an installed bracket to support a lighting fixture is shown in FIG. 16. A light fixture structure 400 may comprise a back panel 402 and an illumination panel 404. A bracket 406 may be used, clasped to the back panel 402 by clasp 408 mating with outward flange 410 along backing panel edge 434, secured with a screw (not shown) placed through clasp hole 412 and flange hole 414. Further stability may be provided by the step panel 416 with bead 418 along seam 420. A first side panel 422 and a side panel 424 on the sides of backing panel 426 may have holes 428, 430, an offset hole 432. Other embodiments can be useful to support or suspend lighting fixtures.

A method of using any of the inventive brackets may comprise positioning the bracket such that the backing panel rests against a vertical wall, allowing a lighting fixture to rest on the outward flange, allowing the weight of the bracket to be held to act upon the outward flange, and allowing a resulting moment to pull the outward flange tightly against the step panel.

The method may be modified or altered to comprise more aspects, concurrently steps, simultaneous steps, or other variations.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

Those of skill in the art would further appreciate that the various illustrative steps described in connection with the embodiments disclosed herein may be implemented with electronic hardware, computer software, or combinations of both. Some of the embodiments and implementations are described above in terms of functional components and various processing steps. However, it should be appreciated that such components may be realized by any number of hardware, software, and/or firmware components configured to perform the specified functions. Whether such functionality is implemented with hardware or software depends upon the particular application and design constraints imposed on the overall system. Skilled artisans may implement the described functionality in varying ways for each particular application, but such implementation decisions should not be interpreted as causing a departure from the scope of the present invention. The word "exemplary" is used exclusively herein to mean "serving as an example, instance, or illustration." Any embodiment described herein as "exemplary" is not necessarily to be construed as preferred or advantageous over other embodiments.

In this document, relational terms such as first and second, and the like may be used solely to distinguish one entity or action from another entity or action without necessarily requiring or implying any actual such relationship or order between such entities or actions. Numerical ordinals such as "first," "second," "third," and such simply denote different singles of a plurality and do not imply any order or sequence unless specifically defined by the claim language. The sequence of the text in any of the claims does not imply that method steps must be performed in a temporal or logical order according to such sequence unless it is specifically defined by the language of the claim. The method steps may be interchanged in any order without departing from the scope of the invention as long as such an interchange does not contradict the claim language and is not logically nonsensical.

Furthermore, depending on the context, two elements may be connected to each other physically or in any other manner, through one or more additional elements.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

The invention claimed is:

1. A corner mounted bracket, comprising:
    a substantially flat, rigid backing panel;
    a first side panel fixed to a first side of the backing panel;
    a second side panel fixed to a second side of the backing panel;
    a step panel fixed to a top side of the backing panel and to a top side of the first side panel and to a top side of the second side panel;
        an outward flange fixed to one end of the step panel;
        and a retaining scoop projecting downward in a direction at about 45 degrees away from a main plane of the backing panel;
        wherein the first side panel is disposed at about 135 degrees from a main plane of the backing panel.

2. The bracket of claim 1 wherein the second side panel is disposed at about 135 degrees from a main plane of the backing panel.

3. The bracket of claim 1 wherein the step panel is substantially trapezoidal in shape.

4. The bracket of claim 1 wherein the first side panel and the second side panel comprise a rigid material.

5. The bracket of claim 4 wherein the rigid material is constructed from a single sheet of rigid material.

6. The bracket of claim 1 further comprising a first stabilizing panel fixed between an edge of the first side panel and an edge of the step panel.

7. The bracket of claim 6 further comprising a second stabilizing panel fixed between an edge of the second side panel and an edge of the step panel.

\* \* \* \* \*